US00RE38237E

(19) United States
(12) Reissued Patent
Elias et al.

(10) Patent Number: US RE38,237 E
(45) Date of Reissued Patent: Aug. 26, 2003

(54) FIBRE OPTIC COUPLERS

(75) Inventors: Martin C. Elias, O'Connor (AU); Scott A. Johnston, Jerrabomberra (AU); Mark R. Hesling, Badok (SG)

(73) Assignee: AOFR Pty. Limited, Act (AU)

(21) Appl. No.: 09/569,581

(22) PCT Filed: Nov. 10, 1994

(86) PCT No.: PCT/AU94/00693

§ 371 (c)(1),
(2), (4) Date: Jun. 26, 1996

(87) PCT Pub. No.: WO95/13554

PCT Pub. Date: May 18, 1995

Related U.S. Patent Documents

Reissue of:
(64) Patent No.: 5,751,873
Issued: May 12, 1998
Appl. No.: 08/646,255
Filed: Nov. 10, 1994

(30) Foreign Application Priority Data

Nov. 10, 1993 (AU) ..... 2330/93

(51) Int. Cl.[7] ..... G02B 6/26
(52) U.S. Cl. ..... 385/51; 385/42; 385/43; 385/46
(58) Field of Search ..... 385/41, 42, 43, 385/44, 45, 46, 47, 48, 51

(56) References Cited

U.S. PATENT DOCUMENTS 4,798,436 A * 1/1989 Mortimore ..... 385/43 X
5,175,782 A * 12/1992 Bowen et al. ..... 385/43 X
5,408,554 A * 4/1995 Cryan et al. ..... 385/43
5,553,179 A * 9/1996 Cryan et al. ..... 385/51 X

OTHER PUBLICATIONS

Arkwright, J., "Novel Structure for Monolithic Fused–Fibre 1×4 Couplers", *Electronics Letters*, vol. 27, No. 19, pp. 1767–1768 (Sep. 12, 1991).*

Mortimore, D., "Monolithic 4×4 Single–Mode Fused Coupler", *Electronics Letters*, vol. 25, No. 10, pp. 682–683 (May 11, 1989).*

Mortimore, D., "Theory and Fabrication of a 4×4 Single–Mode Fused Optical Fiber Couplers", *Applied Optics*, vol .29, No. 3, pp. 371–374 (Jan. 20, 1990).*

Mortimore et al., "Monolithic Wavelength–Flattened 1×4 Singlemode Fused Fibre Coupler", *Electronics Letters*, vol. 27, No. 24, pp. 2252–2253 (Nov. 21, 1991).*

* cited by examiner

*Primary Examiner*—Phan T. H. Palmer
(74) *Attorney, Agent, or Firm*—Altera Law Group, LLC

(57) ABSTRACT

A fused fiber optic 1×4 or 2×4 coupler in which four optical fiber segments (A, B, C, D) extend longitudinally beside each other in a coupling region in which the fiber segments are at least partially fused together to form an assembly exhibiting a close packed cross section in which the fiber cores (11) are centered substantially at the corners of a four sided polygon having a pair or opposite internal acute angles substantially less than 90°.

50 Claims, 6 Drawing Sheets

FIBRE OPTIC COUPLERS

Matter enclosed in heavy brackets [ ] appears in the original patent but forms no part of this reissue specification; matter printed in italics indicates the additions made by reissue.

FIELD OF THE INVENTION

This invention relates to fibre optic couplers and to their manufacture, and in particular to 1×4 or 2×4 biconical taper fused single mode couplers. The description hereinafter will principally refer to 1×4 couplers but the principles involved are also applicable to 2×4 couplers.

As employed herein, the term 1×4 coupler refers to a fibre optic device which will distribute a signal input through a single input port substantially or nearly equally into four output ports. Coupling ratios which are at least comparable in magnitude, for example in the range 0.15 to 0.35 are presently considered by the fibre optic industry to be "substantially or nearly equal" but of course the achievement of equal ratios of 0.25 is the ultimate object. Such devices are especially useful in fibre optic tree networks.

BACKGROUND ART

Fibre optic couplers of 1×4 configuration for single mode applications are presently characterised by a significant degree of wavelength dependence in their principal operating parameters such as coupling ratios and insertion losses. Thus, coupler suppliers generally specify a particular wavelength characteristic for their 1×4 single mode couplers and even so-called "wavelength flattened" 1×4 couplers have approximately flat coupling and insertion loss characteristics only within a single operating band, e.g. 40 nm or 100 nm. It would be desirable to produce a 1×4 single mode coupler which is wideband for the wavelength range 1250–1600 nm, at least in the sense that the coupler is operable in both of the principal transmission wavelength bands for fibre optic communications networks. 1260–1360 and 1430–1580 nm, but more preferably over the whole range 1250–1600 nm.

A number of cross-sectional configurations for the cores of 1×4 biconical taper couplers have been proposed. A simple square array for 4×4 star couplers is described by Mortimore [Electronics Letters (1989), Vol. 25, No. 10, 682], in the context of a particular class of couplers in which the fibres are drawn and fused within a capillary tube which has a lower refractive index then the fibre cladding and which remains an integral component of the coupler. If this array is adapted to a 1×4 splitter coupler, for any given fibre segment which serves as the incident/through fibre, the coupling ratio and insertion loss characteristics with respect to wavelength are similar for the two adjacent fibre segments (which are substantially symmetrically disposed) but quite different for the diagonally opposite fibre segments. Moreover, the cycling of the characteristics with taper ratio and drawn length are quite out of phase, whereby it can be difficult even to control the fusion process to achieve a desired substantially equal power distribution across all four output ports.

Arkwright [Electronics Letters (1991) Vol. 27, No. 19, 1767] describes a five fibre ring in which one fibre is a dedicated input fibre and the other four are output fibres. A proposal for a wholly symmetrical 1×4 coupler configuration is disclosed by Mortimore et al at Electronics Letters (1991), Vol. 27, No. 24, 2252. This configuration entails a hexagonal ring arrangement of fibre segments about a core incident fibre. All fibre segments are of equal diameter and in contact, but only every alternative fibre of the ring is a tap-off fibre: the others are dummy fibres. The result is reported to a quite good broadband response, but a coupler of this kind would be expensive and complex to manufacture.

Australian patent 618108 discloses polygonal section sheaths for a variety of coupler arrays. Sheaths proposed include square and triangular sections, and the patent illustrates or describes 2, 3 or 4 fibre couplers in various arrays.

U.S. Pat. No. 4,798,436 to Mortimore proposes a general technique for adjusting or controlling the characteristics of fibre couplers by varying the relative propagation constants of the fibres of the coupler. For example, one fibre may be differently tapered or different fibres may be selected. Attempts to apply this technique by modifying the fibre segment diagonally opposite the primary or incident fibre segment in the above-mentioned square array, i.e. to compensate for its asymmetric position, have not proven very fruitful. In any event, even if a particular broadband square array could be produced by this approach, its performance would be likely to be too critically dependent on precise fibre position: manufacturing tolerances would be very small.

DISCLOSURE OF THE INVENTION

It is an object of the invention to provide a useful 1×4 or 2×4 fibre optic coupler of a structure which is either wideband in the sense earlier foreshadowed, or is capable, with additional tuning treatment, of exhibiting such a wideband response.

In accordance with a first aspect of the invention, there is provided a fused fibre optic 1×4 or 2×4 coupler in which four optical fibre segments extend longitudinally beside each other in a coupling region in which the fibre segments are at least partially fused together to form an assembly exhibiting a close packed cross-section in which the fibre cores are centered substantially at the comers of a four-sided polygon having a pair of opposite internal acute angles substantially less than 90°, preferably about or a little less than 60°.

According to the first aspect of the invention, the invention further provides a fused fibre optic 1×4 or 2×4 coupler in which four optical fibre segments extend longitudinally beside each other in a coupling region in which the fibre segments are at least partially fused together to form an assembly exhibiting a close packed cross-section in which the centre-to-centre spacings of each of the cores of two of the fibre segments from the other three cores are similar.

According to the first aspect of the invention, the invention further provides a fused fibre optic 1×4 or 2×4 coupler in which four optical fibre segments extend longitudinally beside each other in a coupling region in which the fibre segments are at least partially fused together to form an assembly exhibiting a close packed cross-section in which two of the fibre segments are mutually adjacent and lie between the other two. Preferably, said assembly exhibits a twist in the coupling region, for example a twist of at least 45°. This feature is in marked contrast to prior capillary tube 1×4 fused couplers in which the fibres were laid generally straight and parallel in the tube during the fusion process. In this preferred aspect of the invention, the twist is advantageously applied prior to the fusion and drawing steps and is preferably at least partly applied as a dynamic helical twist.

In accordance with a second aspect of the invention, there is provided a fused fibre optic 1×4 or 2×4 coupler in which four optical fibre segments extend longitudinally beside each other in a coupling region in which the fibre segments are at least partially fused together to form an assembly which is twisted in the coupling region, for example to the extent of at 45°.

In the second aspect of the invention further provides a method of forming a 1×4 or 2×4 fused fibre optic coupler comprising:

disposing four optical fibre segments so that they extend longitudinally beside each other in a cross-sectional array in which the fibre cores are centered substantially at the corners of a four-sided polygon having a pair of opposite internal acute angles substantially less than 90° preferably about or a little less than 60°;

while maintaining the fibre segments under tension, and with those segments on the shorter diagonal of the polygon preferably under greater tension than the other two segments, applying twist to the fibre segments to form a twisted assembly of the fibre segments, preferably at least half a turn and most preferably 1 to 1½ turns;

heating at least a portion of the twisted assembly and at least partly fusing the fibre segments together while drawing the fibre segments longitudinally, whereby to form a coupling region in which the assembly is twisted.

The twist is preferably at least partly applied as a dynamic helical twist.

Preferably, the aforesaid fibres on the shorter axis of the parallelogram are slightly individually pre-twisted before effecting the aforesaid twisting of the assembly.

In its second aspect, the invention still further provides apparatus for carrying out the aforesaid method.

Preferably, in either the first or second aspect of the invention, one or most preferably both of the fibre segments on the shorter diagonal of the assembly have different propagation constants relative to the other two fibre segments. This may be effected by treating fibre segments of similar diameter in the assembly, or one or most preferably both of the fibre segments on the shorter diagonal may be of a diameter smaller than that of the other fibre segments. The smaller diameters are not necessarily equal. This may be achieved in the manufacturing process by pre-tapering or etching one or most preferably both of the shorter diagonal fibre segments. In this case, of course, in the first aspect of the invention, the internal acute angle of the rhombus will be less than 60°, and/or the core—core spacings will differ slightly. The degree of pre-taper may vary in the range 0.1 to 30% and will depend on the fusion conditions used during formation of the taper and the temperature profile of the heat source, and will typically be determined by experimentation in a given case.

It is found that the geometry in accordance with the first aspect of the invention is effective in substantially reducing the phase differences between the coupling ratio and insertion loss characteristics for the assembly at a given wavelength, compared with the simple square array previously referred to, and the preferred pre-tapering allows the characteristics at a given wavelength to be made substantially coincident in turning point and phase relationship. By optimising the pre-tapering, it is possible to synchronise substantially equal power distribution in the two main wavelength bands.

Advantageously, when the manufactured assembly has cooled substantially to ambient temperatures in the coupling region, a slight further twist is applied to the assembly. Such a post-twist has been proposed in relation to 1×3 and 1×2 couplers [T A Birks, Applied Optics (1989) Vol. 28, No. 19, Page 4226] and is useful for fine tuning the coupler characteristics. The post-twist may be accumulative or opposite to twist already present in the assembly in accordance with the second aspect of the invention, although it will typically be opposite to such existing twist.

The function of the coupler as a 1×4 or 2×4 coupler is typically determined by terminating three or two of the four fibre segments at one end of the coupler. Preferably, the residual fibre segment, the through fibre, is one of the shorter diagonal fibres. It is found that better results may be obtained by using one of these shorter diagonal fibre segments as the input or launch fibre.

BRIEF DESCRIPTION OF THE DRAWINGS

By way of further explanation, reference is now made to the accompanying drawings, in which.

Unless otherwise specified the y-axis for all graphs is coupling ratio which is defined as the fraction of total output power.

PREFERRED EMBODIMENTS

Figure 1:
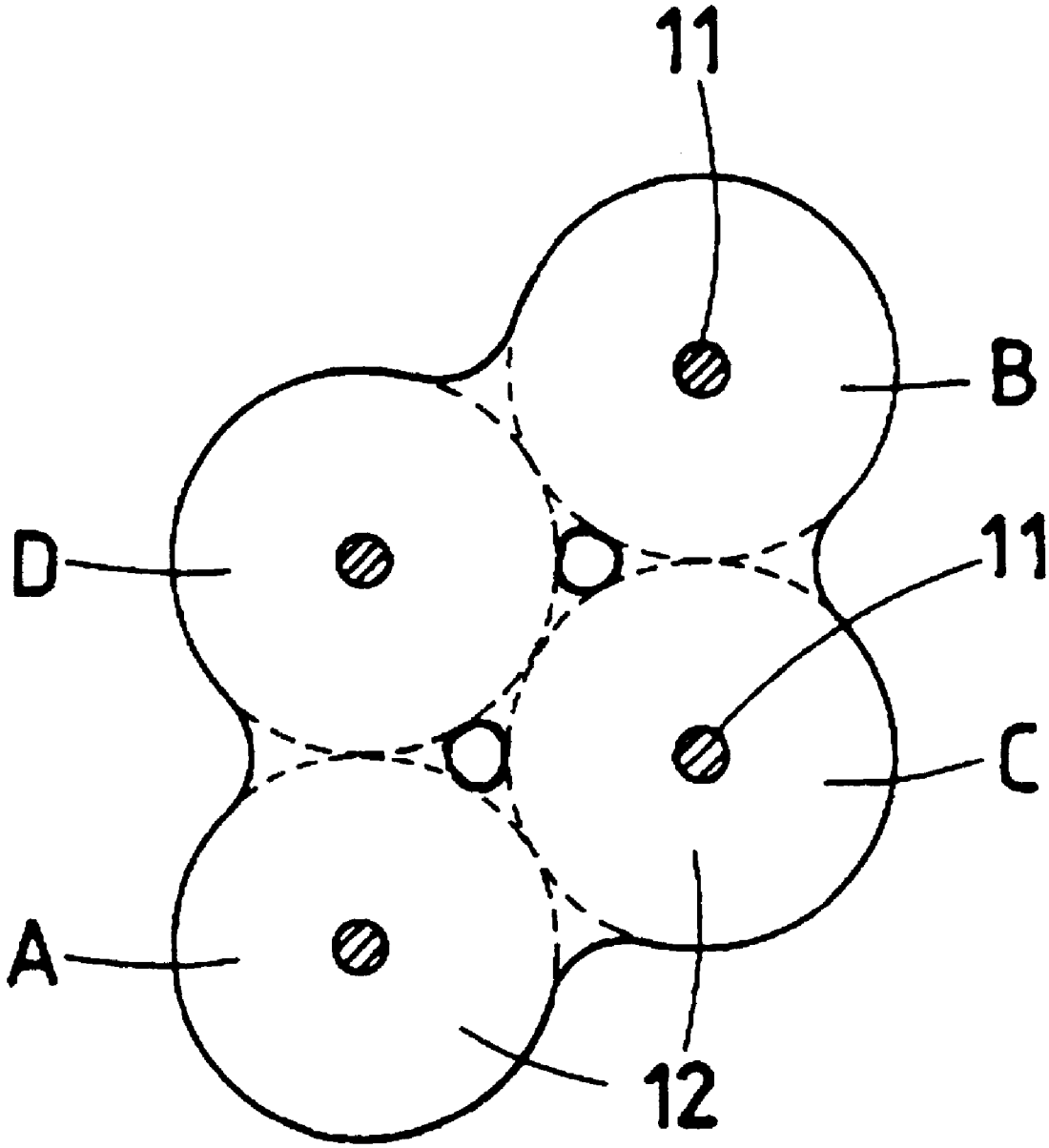
FIG. 1 is a cross-section at the longitudinal centre point of the coupling region of a fused 1×4 fibre optic coupler embodying the present invention.
Figure 3:
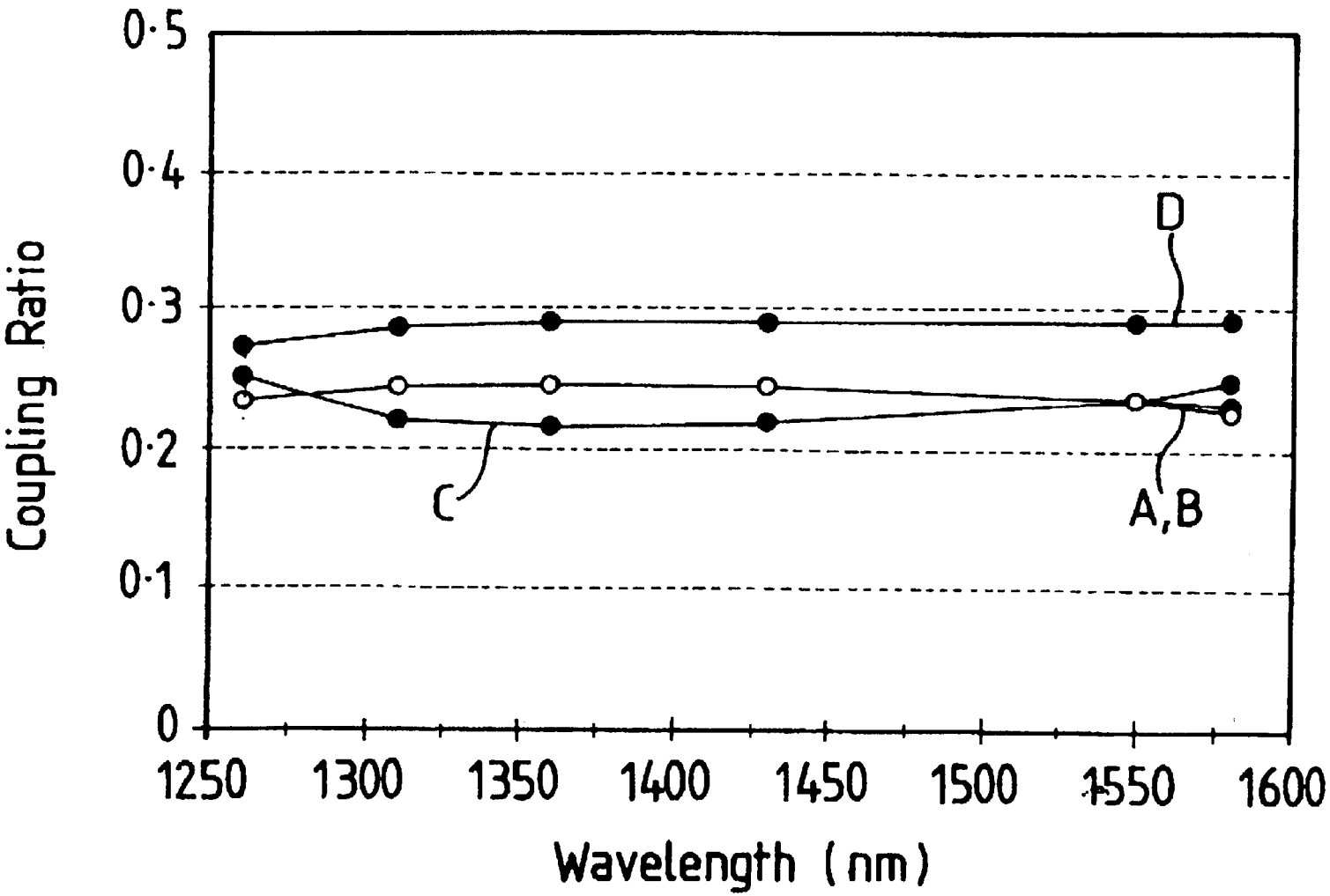
FIG. 3 shows the corresponding coupling ratio characteristics with respect to wavelength, for a similar coupler over the range 1250 to 1600 nm.
Figure 4:
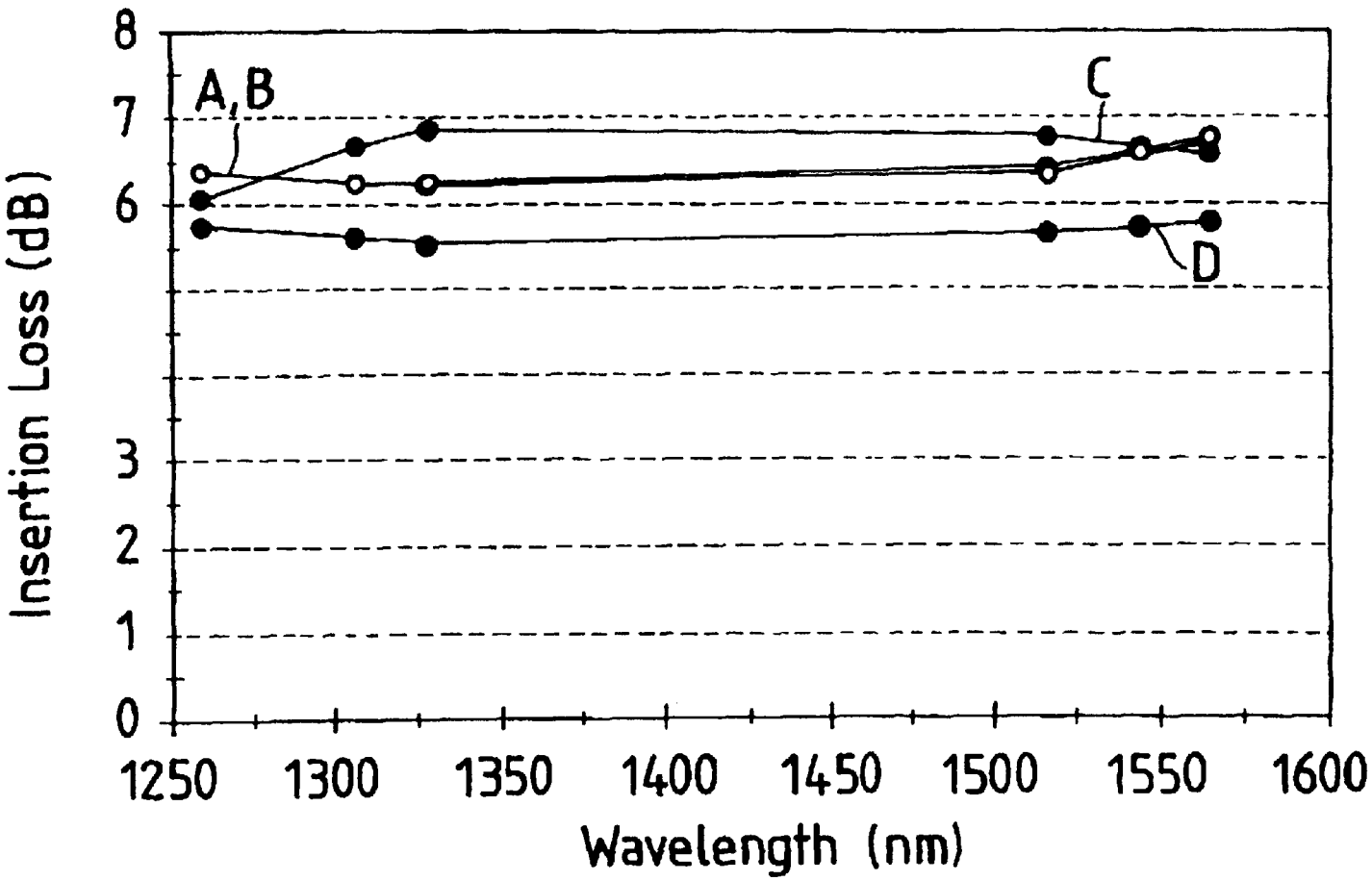
FIG. 4 is a plot similar to FIG. 3 but showing the insertion loss characteristics.

The coupler illustrated in FIG. 1 and exhibiting the characteristics of FIGS. 3 and 4, was formed from four optical fibre segments A, B, C, D cut from the same original fibre. The coupler was formed by the process generally described in U.S. Pat. No. 5,011,252, assigned to the Commonwealth of Australia and licensed to the present applicant. The disclosure of U.S. Pat. No. 5,011,252 is incorporated herein by reference. The apparatus employed was generally of the kind described in that patent, but was modified in two respects of note for present purposes. Firstly, the spaced grips used to position the fibres initially were set so that the four fibre segments were arranged to extend longitudinally beside and parallel to each other in a close-packed cross-sectional array in which they were positioned at the corners of a four-sided polygon, being an approximate rhombus having a pair of opposite internal acute angles a little less than 60°. The term "a little less" is used here because the fibre segments on the shorter diagonal of the rhombus were pre-tapered by being pre-drawn to produce fibre segments of slightly smaller diameter than the other two. The pre-tapering is effected, for the two fibre segments separately, in the furnace before the assembly of four fibre segments is set up as described above.

The second modification of the known apparatus, for the purposes of the second aspect of the invention, was that the twisting step prior to heating, fusion and drawing of the fibre segments to form the coupler, was effected at least in part by applying twist in a dynamic helical fashion, i.e. instead of simply firmly gripping and rotating the fibres at fixed spaced apart points in opposite directions, the assembly is turned at two spaced apart points in a relative helical fashion: the rotators adjust longitudinally as they rotate to allow the path lengths of the fibre segments to slightly increase during the formation of the helical structure and so maintain a constant angle between the fibre segments. The necessary longitudinal adjustment can be determined mathematically for the given configuration: the rotators would of course be under the control of suitable computer-based equipment. By contrast, in what may be called "static" twist, the rotators do not move outward and the angle between the fibres increases as the twist lengthens between the rotators. It is the applicant's experience that is appears preferable to use the dynamic case because it improves the control of the geometry, though the use of purely static twist is certainly not precluded.

This twisting technique is used in order to maintain a uniform cross-section throughout the subsequent coupling region and to ensure a uniformity of contact and tension in the fibre segments along this region.

The twist is preferably applied to the fibre assembly by first applying 180° (½ turn) of twist in a static fashion to contact the fibre segments, and then the balance as a dynamic helical twist.

The preferred twist inserted in the fibre assembly is such that, between the grips, there is between 1 and 1½ turns of twist, e.g. about 1.25 turns. A proportion of this twist, preferably at least 45° C., is retained in the coupling region. The stability and uniformity of the twisted structure may be further enhanced by arranging for the tension applied to the shorter diagonal fibre segments during twisting to be greater (e.g. about four times greater) than the tension being applied to the other fibre segments.

The next stages of the process are essentially conventional. Light is applied at one end to one of the shorter diagonal fibre segments and the power output on all four segments at the other end is monitored. The respective coupling ratios and/or insertion losses are calculated and continuously displayed. A furnace is moved transversely and brought about the twisted assembly, which is thereby heated. When softened, the assembly is drawn in opposite directions so as to taper the fibre segments and their cores 11 as the claddings 12 fuse transversely together to form a fused cladding mass. When the observed coupling ratios and insertion losses for the various combinations of fibre segments are observed to be as required, the drawing is stopped, the temperature of the furnace is lowered and the coupler retrieved.

The assembly is then subjected to known coupler post-processing steps including truncation of the other three input side fibre segments, and encapsulation within a sealing tube and outer sheath. These steps are well known in the art and will not be further described.

Figure 2:
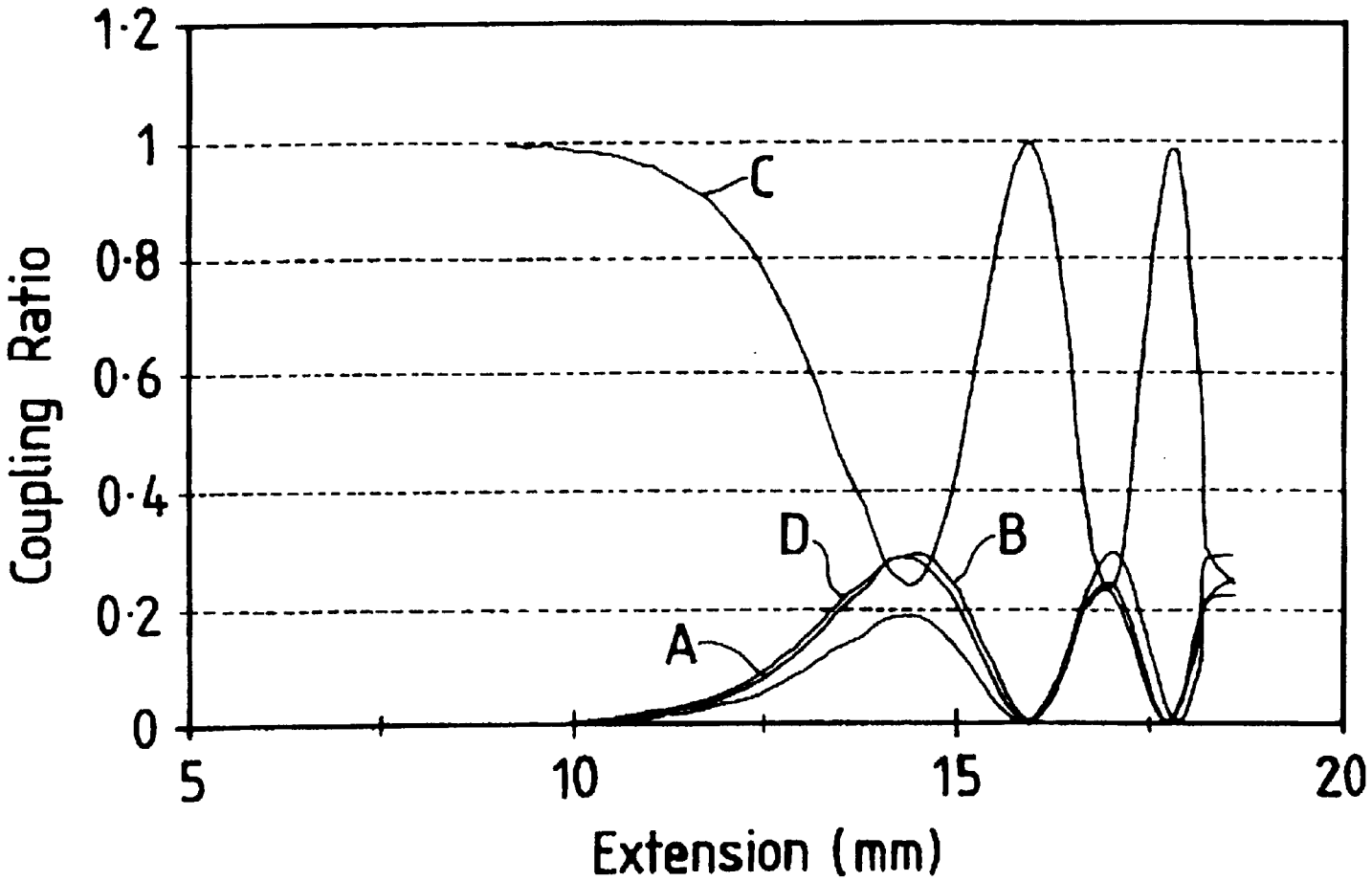
FIG. 2 is a plot of monitored coupling ratios with respect to drawing length as a coupler having a geometry according to the first aspect of the invention is being formed through sustained drawing and fusion.
Figure 5:
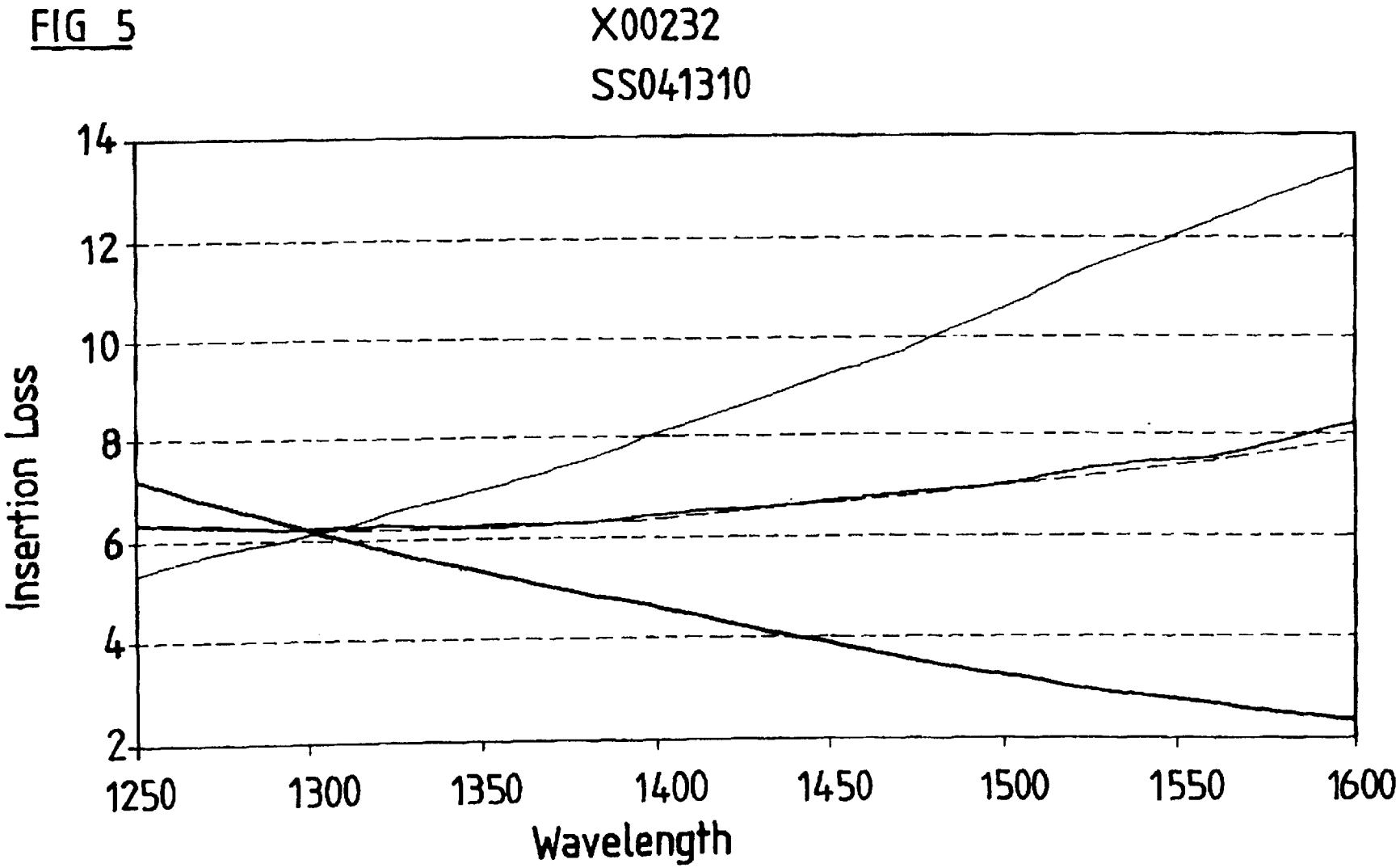
FIG. 5 is a plot similar to FIG. 4 for a conventional 1×4 coupler of simple square cross-sectional geometry.

FIG. 2 is a example of the monitored coupling ratios for the four output fibre segments during a typical coupler formation process in accordance with an embodiment of the invention. Curves A and B are for the two longer diagonal segments and are, as expected given the overall symmetry, similar. Curve C is for the shorter diagonal fibre segment used as the input or launch fibre and curve D is for the other shorter diagonal fibre segment. (These designations also apply to FIGS. 1, 3 and 4). Importantly, it will be seen that the three curves are substantially in phase with respect to time and, moreover, that there are times in which cessation of the drawing will give similar coupling ratios, within the range 0.19 to 0.3 for the four fibre segments. Indeed, a close to even split among the four fibres can be achieved. In a typical simple square array configuration, such as those described in the prior art, curves A and B would typically be in phase and similar, but curves C and D would be well out of phase. Importantly, it is found that the in-phase relationship for the curves is preserved for wavelengths in the two principal transmission bands and this is demonstrated by comparing FIGS. 3 and 4 with FIG. 5. Although the present invention does not achieve a coupler of complete response uniformity over the whole of the band 1250 to 1600 nm, the relative coupling ratios and insertion losses do not vary greatly at these two wavelengths.

It is now proposed to discuss in turn the respective effects achieved with the geometry of the coupler, modification of the propagation constant of the shorter diagonal secondary (output) fibre segment, and modification of the shorter diagonal primary (incident or input) fibre segment.

Modification of the geometry from a simple square array to that shown in FIG. 1 significantly changed the coupling response, even without pre-tapering. Using one of the shorter diagonal fibre segments as the primary or input, the coupling response with tapering during fusion modified the relative phase relationships of the coupling ratio characteristics but no substantially equal coupling point was achieved. If one of the longer diagonal fibre segments was used as the primary, the coupling behaviour reverted to that typical of square arrays. By using pre-tapering to modify the propagation constant of only the shorter diagonal secondary, the coupling behavior can be modified. The peak coupling to the longer diagonal fibres is increased and the peak coupling to the shorter diagonal secondary is reduced while moving closer in time to the peak for the longer diagonal fibre segments. By optimising the amount of pre-taper it is possible to achieve a response where the coupling curves for all three non-launch fibres are coincident. This enables the achievement of an equal coupling point at one wavelength.

By terminating the process at a suitable time each fibre can exhibit equal coupling at two wavelength bands although the uniformity of coupling across all fibres at either wavelength may be poor. By also modifying the propagation constant of the primary fibre segment in conjunction with the modifications detailed above, the characteristics of FIG. 3 are achieved. The first minimum in the primary coupling curve has been raised from the zero level. This naturally results in a lower peak coupling to the three non-launch fibres. By optimising the amounts of pre-tapering applied to each of the shorter diagonal fibre segments, in this example it is possible to synchronise the second equal coupling point at 1544 nm with the first equal coupling point at 1306 mm thus giving a near equal distribution of power at both wavelengths and hence a wide-band coupler.

It is possible that the two pre-tapers are preferably similar so that the two shorter diagonal fibre segments are of an equal diameter lesser than the other two.

Figure 6:
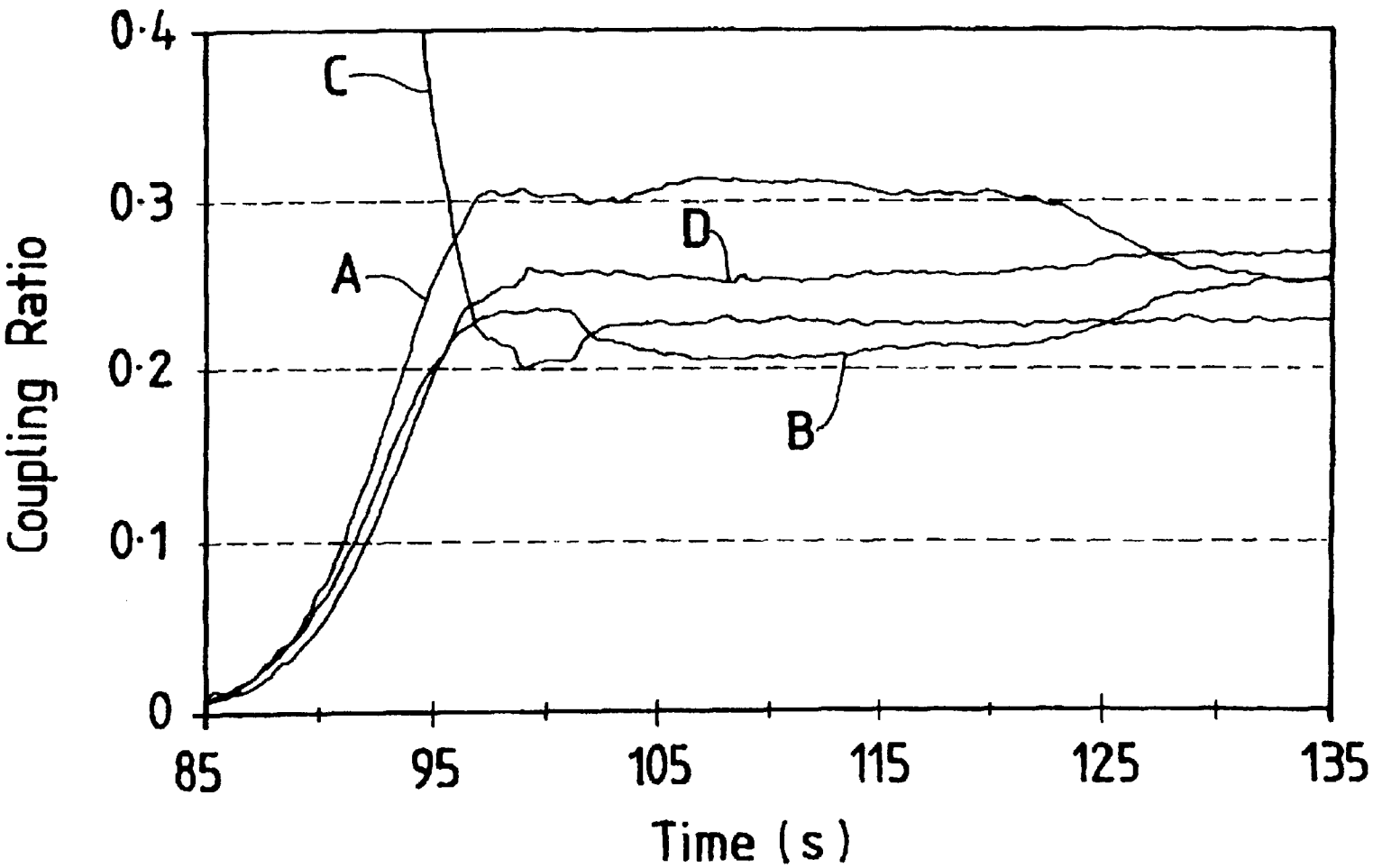
FIG. 6 is a plot similar to FIG. 2 but in which drawing is terminated at T≅97 and in which a post twist is applied from T=120 to T=131.

FIG. 6 demonstrates the retained coupling ratios for the different output fibres if drawing and fusion is stopped at T=97. It is found that the differences between the characteristics are further reduced by applying a slight post-twist, in accordance with a preferred aspect of the invention. The effect of this post-twist is demonstrated at the right of FIG. 6 for a post twist applied from T=120 to T=131.

Throughout this specification and the claims which follows, unless the context requires otherwise, the word "comprise", or variations such as "comprises" or "comprising", will be understood to imply the inclusion of a stated integer or group of integers but not the exclusion of any other integer or group of integers.

We claim:

1. A fused fiber optic 1×4 or 2×4 coupler in which four optical fibre segments extend longitudinally beside each other in a coupling region in which the fibre segments are at least partially fused together to form an assembly exhibiting a close packed cross-section in which the fibre cores are centered substantially at the corners of a four-sided polygon having a pair of opposite internal acute angles substantially less than 90°.

2. A coupler according to claim 1 wherein said opposite internal acute angles are about or a little less than 60°.

3. A coupler according to claim 1 or 2 wherein said assembly is twisted in the coupling region.

4. A coupler according to claim 3 wherein said coupler has been formed by drawing the fibre segments longitudinally while they are being at least partially fused together, and wherein said twist is applied prior to the fusion and drawing steps and has been at least partly applied as a dynamic helical twist.

5. A coupler according to claim 1 wherein at least one of the two fibre segments on the shorter diagonal of the assembly has different propagation constants relative to the other two fibre segments.

6. A coupler according to claim 5 wherein said one or both of the two fibre segments on the shorter diagonal is of a diameter smaller than that of the other fibre segments, which smaller diameters are not necessarily equal.

7. A coupler according to claim 5 wherein both of the fibre segments on the shorter diagonal have different propagation constants relative to the other two fibre segments.

8. A coupler according to claim 1 or 2 wherein said assembly is twisted in the coupling region with a twist of at least 45°.

9. A fused fibre optic 1×4 or 2×4 coupler in which four optical fibre segments extend longitudinally beside each other in a coupling region in which the fibre segments are at least partially fused together to form an assembly exhibiting a close packed cross-section in which the centre-to-centre spacings of each of the cores of two of the fibre segments from the other three cores are similar.

10. A coupler according to claim 9 wherein at least one of the two fibre segments on the shorter diagonal of the assembly has different propagation constants relative to the other two fibre segments.

11. A coupler according to claim 10 wherein both of the fibre segments on the shorter diagonal have different propagation constants relative to the other two fibre segments.

12. A coupler according to claim 10 wherein said one or both of the two fibre segments on the shorter diagonal is of a diameter smaller than that of the other fibre segments, which smaller diameters are not necessarily equal.

13. A coupler according to claim 9 wherein said assembly is twisted in the coupling region.

14. A coupler according to claim 13 wherein said coupler has been formed by drawing the fibre segments longitudinally while they are being at least partially fused together, and wherein said twist is applied prior to the fusion and drawing steps and has been at least partly applied as a dynamic helical twist.

15. A coupler according to claim 9 wherein said assembly is twisted in the coupling region with a twist of at least 45°.

16. A fused fibre optic 1×4 or 2×4 coupler in which four optical fibre segments extend longitudinally beside each other in a coupling region in which the fibre segments are at least partially fused together to form an assembly exhibiting a close packed cross-section in which two of the fibre segments are mutually adjacent and lie between the other two.

17. A coupler according to claim 16 wherein at least one of the two fibre segments on the shorter diagonal of the assembly has different propagation constants relative to the other two fibre segments.

18. A coupler according to claim 17 wherein both of the fibre segments on the shorter diagonal have different propagation constants relative to the other two fibre segments.

19. A coupler according to claim 17 wherein said one or both of the two fibre segments on the shorter diagonal is of a diameter smaller than that of the other fibre segments, which smaller diameters are not necessarily equal.

20. A coupler according to claim 16 wherein said assembly is twisted in the coupling region.

21. A coupler according to claim 20 wherein said coupler has been formed by drawing the fibre segments longitudinally while they are being at least partially fused together, and wherein said twist is applied prior to the fusion and drawing steps and has been at least partly applied as a dynamic helical twist.

22. A coupler according to claim 16 wherein said assembly is twisted in the coupling region with a twist of at least half a turn.

23. A method of forming a 1×4 or 2×4 fused fibre optic coupler comprising:

disposing four optical fibre segments so that they extend longitudinally beside each other in a cross-sectional array in which the fibre cores are centered substantially at the corners of a four-sided polygon having a pair of opposite internal acute angles substantially less than 90°;

while maintaining the fibre segments under tension, and with those segments on the shorter diagonal of the polygon preferably under greater tension than the other two segments, applying twist to the fibre segments to form a twisted assembly of the fibre segments;

heating at least a portion of the twisted assembly and at least partly fusing the fibre segments together while drawing the fibre segments longitudinally, whereby to form a coupling region in which the assembly is twisted.

24. A method according to claim 23 wherein at least one of the two fibre segments on the shorter diagonal of the assembly has different propagation constants relative to the other two fibre segments.

25. A method according to claim 24 wherein both of the fibre segments on the shorter diagonal have different propagation constants relative to the other two fibre segments.

26. A method according to claim 24 wherein said one or both of the two fibre segments on the shorter diagonal is of a diameter smaller than that of the other fibre segments, which smaller diameters are not necessarily equal.

27. A method according to claim 23 wherein said twist is at least partly applied as a dynamic helical twist.

28. A method according to claim 23 or 27 wherein said fibres on the shorter axis of the parallelogram are slightly individually pre-twisted before effecting the aforesaid twisting of the assembly.

29. A method according to claim 23 wherein said opposite internal acute angles are about or a little less than 60°.

30. A method according to claim 23 wherein said twist is such as to result in a twist in the coupling region of the coupler, after formation and subsequent processing steps, of at least 45°.

31. A method according to claim 23 wherein, when the manufactured assembly has cooled substantially to ambient temperatures in the coupling region, a slight further twist is applied to the assembly for fine tuning the coupler characteristics, such further twist being accumulative or opposite to twist already present in the assembly.

*32. A fused fibre optic 1×4 or 2×4 coupler comprising*

*four optical fibre segments that extend longitudinally beside each other in a coupling region, the fibre segments being at least partially fused together to form an assembly in which the fibre cores are centered at the corners of a four-sided polygon, wherein coupling ratios for each of the fibres fall within 0.19 to 0.30 for wavelength bands of 1260 to 1360 nm and 1430 to 1580 nm.*

*33. The fused fibre optic 1×4 or 2×4 coupler of claim 32, wherein the fibre cores are centered at the corners of a four-sided polygon having a pair of opposite internal acute angles.*

*34. The fused fiber optic 1×4 or 2×4 coupler of claim 33, wherein the pair of opposite internal acute angles are substantially less than 90°.*

*35. The fused fibre optic 1×4 or 2×4 coupler of claim 34, wherein the pair of opposite internal acute angles are about or a little less than 60°.*

*36. The fused fibre optic 1×4 or 2×4 coupler of claim 33, wherein at least one of the two fibre segments on a shorter diagonal of the four-sided polygon has different propagation constants relative to the other two fibre segments.*

*37. The fused fibre optic 1×4 or 2×4 coupler of claim 36, wherein one or both of the two fibre segments on the shorter diagonal has a diameter smaller than that of the other fibre segments.*

*38. The fused fibre optic 1×4 or 2×4 coupler of claim 32, wherein coupling ratios for each of the fibres fall within 0.19 to 0.30 for wavelength band of 1250 to 1600 nm.*

*39. The fused fiber optic 1×4 or 2×4 coupler of claim 32, wherein the assembly is twisted in the coupling region.*

*40. The fused fibre optic 1×4 or 2×4 coupler of claim 32, wherein centre-to-centre spacings between each of the cores of two of the fibre segments and the other three cores are substantially similar.*

*41. The fused fibre optic 1×4 or 2×4 coupler of claim 32, wherein two of the fibre segments are in contact and positioned between the other two fibre segments.*

*42. A method of forming a 1×4 or 2×4 fused fibre optic coupler, comprising steps of:*

*disposing four optical fibre segments so that they extend longitudinally beside each other in an assembly in which the fiber cores are centered at the corners of a four-sided polygon; and*

*at least partially fusing the four optical fibre segments in a coupling region;*

*wherein, upon completion of the formation of the fibre optic coupler, the four optical fibre segments have coupling ratios for each of the fibres that fall within 0.19 to 0.30 for wavelength bands of 1260 to 1360 nm and 1430 to 1580 nm.*

*43. The method of claim 42, further comprising*

*twisting the fibre segments to from a twisted assembly prior to at least partially fusing the four optical fibre segments.*

*44. The method of claim 43, wherein the step of disposing four optical fibre segments comprises disposing four optical fibre segments so that they extend longitudinally beside each other in an assembly in which the fibre cores are centered at the corners of a four-sided polygon with a pair of opposite internal acute angles.*

*45. The method of claim 44, wherein the step of twisting the fibre segments comprises twisting the fibre segments while maintaining the fibre segments under tension.*

*46. The method of claim 45, wherein the step of twisting the fibre segments comprises twisting the fibre segments while maintaining the fibre segments under tension with greater tension maintained on those fibre segments on a shorter diagonal of the four-sided polygon.*

*47. The method of claim 46, further comprising twisting the two fibre segments on the shorter diagonal of the four-sided polygon prior to twisting the four fibre segments.*

*48. The method of claim 43, wherein at least partially fusing the four optical fibre segments comprises heating the four optical fibre segments in a coupling region.*

*49. The method of claim 48, further comprising twisting the four optical fibre segments after heating for fine tuning of the coupling characteristics.*

*50. The method of claim 43, wherein the step of twisting the fibre segments comprises twisting the fibre segments while maintaining the fibre segments under tension.*

* * * * *